US012770988B2

(12) United States Patent
Dong et al.

(10) Patent No.: US 12,770,988 B2
(45) Date of Patent: Oct. 20, 2026

(54) CELL HAVING ELECTRODE WITH EXPANDED GAP AND ELECTRONIC DEVICE

(71) Applicants: NINGDE AMPEREX TECHNOLOGY LIMITED, Ningde City (CN); DONGGUAN AMPEREX TECHNOLOGY LIMITED, Dongguan City (CN)

(72) Inventors: Yuyang Dong, Ningde City (CN); Dongyang Yan, Ningde City (CN); Qiao Zeng, Ningde City (CN)

(73) Assignees: NINGDE AMPEREX TECHNOLOGY LIMITED, Ningde City (CN); DONGGUAN AMPEREX TECHNOLOGY LIMITED, Dongguan City (CN)

( * ) Notice: Subject to any disclaimer, the term of this patent is extended or adjusted under 35 U.S.C. 154(b) by 712 days.

(21) Appl. No.: 18/128,605

(22) Filed: Mar. 30, 2023

(65) Prior Publication Data

US 2023/0238664 A1 Jul. 27, 2023

Related U.S. Application Data

(63) Continuation of application No. PCT/CN2021/084751, filed on Mar. 31, 2021.

(51) Int. Cl.
*H01M 50/538* (2021.01)

(52) U.S. Cl.
CPC .................................. *H01M 50/538* (2021.01)

(58) Field of Classification Search
CPC .................................................... H01M 50/538
See application file for complete search history.

(56) References Cited

U.S. PATENT DOCUMENTS 8,481,198 B2 7/2013 Ohashi et al.
11,552,357 B2 1/2023 Kim et al.
(Continued)

FOREIGN PATENT DOCUMENTS

CN 101471451 A 7/2009
CN 202434660 U 9/2012
(Continued)

OTHER PUBLICATIONS

Office Action dated Sep. 26, 2023, issued in counterpart CN Application No. 202180002904.6. (8 pages).
(Continued)

*Primary Examiner* — Jimmy Vo
(74) *Attorney, Agent, or Firm* — WHDA, LLP

(57) ABSTRACT

An electrode assembly comprises: a first electrode plate, a second electrode plate and a first layer containing an insulating material, the first layer is sandwiched between the first electrode plate and the second electrode plate, and the first electrode plate, the second electrode plate and the first layer are stacked and then partially folded back to form the electrode assembly; the first electrode plate includes a first surface and a second surface that are opposite to and connected with each other, the first surface and the second surface are formed by the folding-back and separated by an inflection point of the folding-back; a first distance is provided between the first surface and the second surface in a first direction; the first distance is different along a second direction perpendicular to the first direction.

20 Claims, 10 Drawing Sheets

100

(56) References Cited

U.S. PATENT DOCUMENTS

| | | | | |
|---|---|---|---|---|
| 2009/0169993 | A1 | 7/2009 | Ohashi et al. | |
| 2014/0272537 | A1 * | 9/2014 | Kretschmar ........ | H01M 50/538<br>429/149 |
| 2022/0131217 | A1 | 4/2022 | Kim et al. | |

FOREIGN PATENT DOCUMENTS

| | | | | |
|---|---|---|---|---|
| CN | 205508965 | U | | 8/2016 |
| CN | 105990610 | A | | 10/2016 |
| CN | 206250284 | U | | 6/2017 |
| CN | 208014838 | U | | 10/2018 |
| CN | 209401734 | U | | 9/2019 |
| CN | 209401755 | U | * | 9/2019 |
| CN | 210136949 | U | | 3/2020 |
| CN | 112331928 | A | | 2/2021 |
| JP | 2001313062 | A | | 11/2001 |
| JP | 2013191282 | A | * | 9/2013 |
| KR | 20190090305 | A | | 8/2019 |
| WO | 2007/084561 | A2 | | 7/2007 |

OTHER PUBLICATIONS

Office Action dated May 23, 2024, issued in counterpart CN Application No. 202180002904.6. (8 pages).

International Search Report dated Dec. 30, 2021, issued in counterpart Application No. PCT/CN2021/084751. (4 pages).

* cited by examiner

CELL HAVING ELECTRODE WITH EXPANDED GAP AND ELECTRONIC DEVICE

CROSS-REFERENCE TO RELATED APPLICATION

The present application is a continuation application of PCT Application Serial No. PCT/CN2021/084751, filed on Mar. 31, 2021, the content of which is incorporated by reference in its entirety.

FIELD

The present application relates to an electrode assembly and an electronic device.

BACKGROUND

With the development of lithium battery researches, the development direction of lithium-ion battery is towards high capacity, high voltage and long cycle, which makes the electrolyte consumption of a cell gradually become a research hotspot. In the existing battery technology, the attenuation of recovery capacity after a long cycle (equal to or more than 500 charge and discharge) is rapid, partially because the electrolyte is basically exhausted in the later stage of the cycle.

SUMMARY

In view of the above situation, it is necessary to provide an electrode assembly and an electronic device so as to solve the problem of rapid capacity attenuation caused by electrolyte consumption of a cell after a long cycle.

An embodiment of the present application provides an electrode assembly, comprising: a first electrode plate, a second electrode plate and a first layer containing an insulating material. The first layer is sandwiched between the first electrode plate and the second electrode plate; and the first electrode plate, the second electrode plate and the first layer are stacked and then partially folded back to form the electrode assembly. The first electrode plate includes a first surface and a second surface that are opposite to and connected with each other, the first surface and the second surface are formed by the folding-back and demarcated by an inflection point of the folding-back. A first distance is provided between the first surface and the second surface in a first direction; the first distance is different along a second direction perpendicular to the first direction.

The above-mentioned electrode assembly may improve an actual electrolyte retention amount of the cell, improve a condition of a circulating interface and improve a service life of the cell by arranging a cavity at a corner of the first electrode plate. The structure is simple and reliable, and the economic efficiency of the battery is improved.

In some embodiments of the present application, a maximum first distance is provided between the first surface and the second surface in the first direction; viewed from the third direction, by taking the maximum first distance as a starting point, the distance gradually decreases along a direction away from and/or close to the inflection point.

In some embodiments of the present application, the electrode assembly further comprises a first region, the first region is surrounded by the first surface and the second surface; a maximum width of the first region in a second direction is larger than a maximum width of the first region in the first direction.

In some embodiments of the present application, the maximum width of the first region in the first direction is different along a third direction perpendicular to the first direction and the second direction.

In some embodiments of the present application, the maximum width of the first region in the second direction is different along a third direction perpendicular to the first direction and the second direction.

In some embodiments of the present application, the first electrode plate further includes: a first bending region and a second bending region that are opposite to and connected with each other, and a first part and a second part that are opposite to each other; the first surface is located on a side of the first bending region facing the second bending region, and the second surface is located on a side of the second bending region facing the first bending region; the first part is connected with the first bending region, and the second part is connected with the second bending region.

In some embodiments of the present application, the first layer is arranged between the first part and the second part.

In some embodiments of the present application, the first part includes a first plane; the second direction forms an angle with the first plane.

In some embodiments of the present application, the electrode assembly further comprises a first metal plate and a second metal plate; the first electrode plate further includes a first conductive layer and a second region, and the second region is connected with the first part or the second part; the second electrode plate further includes a second conductive layer and a third region, and the third region is adjacent to the first part or the second part; the first metal plate is electrically connected with the first conductive layer located in the second region; the second metal plate is electrically connected with the second conductive layer located in the third region.

In some embodiments of the present application, the electrode assembly further comprises a first metal plate and a second metal plate; the first electrode plate further includes a first conductive layer and a second region, and the second region is located at an end portion of the first electrode plate away from a central region of the electrode assembly; the second electrode plate further includes a second conductive layer and a third region, and the third region is located at an end portion of the second electrode plate away from the central region of the electrode assembly; the first metal plate is electrically connected with the first conductive layer located in the second region; the second metal plate is electrically connected with the second conductive layer located in the third region.

In some embodiments of the present application, the first conductive layer includes a first current collector, and the second conductive layer includes a second current collector.

In some embodiments of the present application, a separator and/or an electrolyte is accommodated between the first surface and the second surface.

An embodiment of the present application further provides an electronic device, comprising the above-mentioned electrode assembly.

Figure 1:
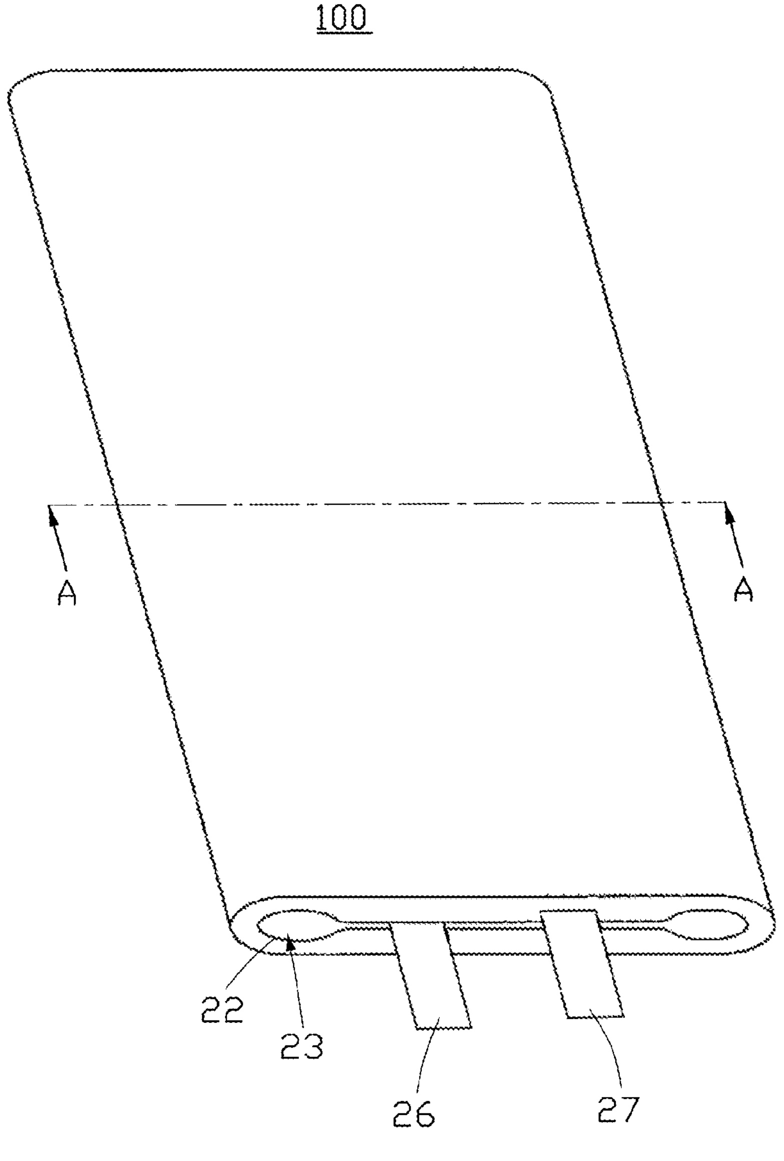
FIG. 1 is a structural diagram of a cell in an embodiment of the present application.

| Reference numerals of main elements | |
|---|---|
| Cell | 100 |
| Housing | 1 |
| Electrode assembly | 2 |
| First bending section | 21 |
| Inflection point | 211 |
| First electrode plate | 22 |
| First conductive layer | 221 |
| First conductive material layer | 222 |
| First bending region | 223 |
| First surface | 2231 |
| Second bending region | 224 |
| Second surface | 2241 |
| First part | 225 |
| First plane | 2251 |
| Second part | 226 |
| Second plane | 2261 |
| Second region | 227 |
| First region | 23 |
| First distance | 231 |
| Second distance | 232 |
| Second electrode plate | 24 |
| Second conductive layer | 241 |
| Second conductive material layer | 242 |
| Third region | 243 |
| First layer | 25 |
| First metal plate | 26 |
| Second metal plate | 27 |
| Flat section | 28 |
| Central region | 29 |
| First direction | Z |
| Second direction | X |
| Third direction | Y |
| Midpoint | P1 |
| Third distance | H1 |
| Fourth distance | H2 |

The following specific embodiments will further describe the present application in combination with the above drawings.

DETAILED DESCRIPTION

Hereinafter, the technical solutions in the embodiments of the present application are described clearly and in detail. It goes without saying that the described embodiments are a part of the embodiments of the present application, not all of the embodiments. Unless otherwise defined, all technical and scientific terms used herein have the same meanings as those commonly understood by those skilled in the art of the present application. The terms used in the description of the present application are only for the purpose of describing specific embodiments and are not intended to limit the present application.

Hereinafter, embodiments of the present application will be described in detail. However, the present application may be embodied in many different forms and should not be construed as being limited to the exemplary embodiments described herein. Rather, these exemplary embodiments are provided so that the present application may be thoroughly and in detail communicated to those skilled in the art.

In addition, for simplicity and clarity, in the drawings, the size or thickness of various components and layers may be enlarged. Throughout the text, the same values refer to the same elements. As used herein, the term "and/or" includes any and all combinations of one or more related enumerated items. In addition, it should be understood that when Element A is referred to as "connecting" with Element B, Element A may be directly connected with Element B, or there may be intermediate Element C, and Element A and Element B may be indirectly connected with each other.

Furthermore, when describing embodiments of the present application, "may" is used to refer to "one or more embodiments of the present application".

The technical terms used herein are for the purpose of describing specific embodiments and are not intended to limit the present application. As used herein, a singular form is intended to include a plural form, unless the context otherwise expressly indicates. It should be further understood that the term "including", when used in this description, refers to the existence of the described features, values, steps, operations, elements and/or components, but does not exclude the existence or addition of one or more other features, values, steps, operations, elements, components and/or combinations thereof.

Terms related to space, such as "above", may be used for convenient description herein so as to describe the relationship between one element or feature and another element (or multiple elements) or feature (or multiple features) as illustrated in figures. It should be understood that in addition to the directions described in figures, the terms related to space are intended to include different directions of an equipment or device in use or operation. It should be understood that although the terms "first", "second", "third", etc. may be used herein to describe various elements, components, regions, layers and/or parts, these elements, components, regions, layers and/or parts shall not be limited by these terms. These terms are used to distinguish one element, component, region, layer or part from another element, component, region, layer or part. Therefore, a first element, component, region, layer or part discussed hereinafter may be referred to as a second element, component, region, layer or part without departing from the teachings of the exemplary embodiments.

An embodiment of the present application provides an electrode assembly and an electronic device arranged with the electrode assembly. The electrode assembly includes: a first electrode plate, a second electrode plate and a first layer containing an insulating material. The first layer is sandwiched between the first electrode plate and the second electrode plate, and the first electrode plate, the second electrode plate and the first layer are stacked and then partially folded back to form the electrode assembly. The first electrode plate includes a first surface and a second surface that are opposite to and connected with each other, the first surface and the second surface are formed by the folding-back and demarcated by an inflection point of the folding-back. A first distance is provided between the first surface and the second surface in a first direction. The first distance is different along a second direction perpendicular to the first direction.

The above-mentioned electrode assembly may improve an actual electrolyte retention amount of the cell, improve a condition of a circulating interface and improve a service life of the cell by arranging a cavity at the corner of the first electrode plate. The structure is simple and reliable, and the economic efficiency of the battery is improved.

Hereinafter, some embodiments of the present application are described in detail in combination with the accompanying drawings. The following embodiments and features in the embodiments may be combined with each other without conflict.

An embodiment of the present application provides an electrochemical device. The electrochemical device may be a rechargeable and dischargeable secondary battery.

More specifically, the secondary battery may be a non-aqueous electrolyte battery, such as a lithium-ion rechargeable battery.

Figure 2:
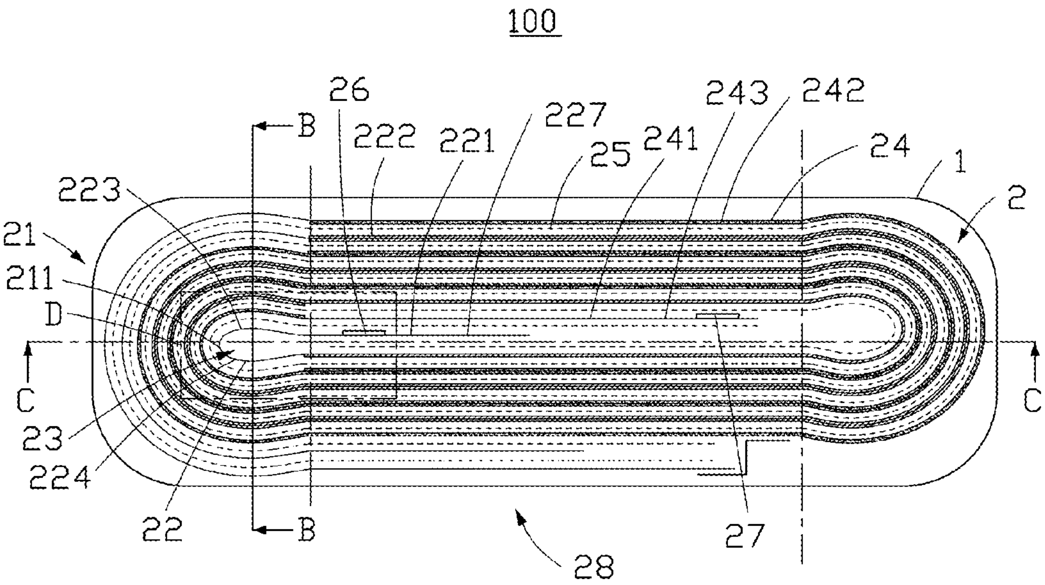
FIG. 2 is a sectional view of section A-A in the cell in an embodiment of the present application.

As shown in FIGS. 1 and 2, the electrochemical device includes a cell 100. The cell 100 includes a housing 1, an electrode assembly 2 and an electrolyte, and the electrode assembly 2 and the electrolyte are arranged in the housing 1.

The electrode assembly 2 includes a first electrode plate 22, a second electrode plate 24 and a first layer 25 containing an insulating material. The first layer 25 is sandwiched between the first electrode plate 22 and the second electrode plate 24. The first electrode plate 22, the second electrode plate 24 and the first layer 25 are stacked and then partially folded back to form the electrode assembly 2.

The first electrode plate 22 includes a first conductive layer 221 and a first conductive material layer 222. The first conductive material layer 222 is arranged on a surface of the first electrode plate 22.

In some embodiments, the first conductive material layer 222 may be a first active material layer.

The first conductive layer 221 may be a first current collector.

A material of the first current collector may be any of metal materials such as aluminum foil and copper foil.

The second electrode plate 24 includes a second conductive layer 241 and a second conductive material layer 242. The second conductive material layer 242 is arranged on a surface of the second electrode plate 24.

In some embodiments, the second conductive material layer may be a second active material layer.

The second conductive layer 241 may be a second current collector.

A material of the second current collector may be any of metal materials such as aluminum foil and copper foil.

The first electrode plate 22 is one of a positive electrode plate or a negative electrode plate, and the second electrode plate 24 is the other type of a positive electrode plate or a negative electrode plate in comparison with the first electrode plate 22.

When the first electrode plate is a positive electrode plate and the second electrode plate is a negative electrode plate, the first active material layer may include, but is not limited to, lithium cobalt oxide, lithium nickel oxide, lithium manganese oxide, lithium manganese nickel oxide, lithium nickel manganese cobalt oxide, lithium nickel cobalt aluminum oxide, lithium phosphate having olivine structure, etc., or one or more combinations of various other materials that may be used as positive active materials of secondary batteries. The second active material layer may include but is not limited to natural graphite, artificial graphite, soft carbon, hard carbon, silicon, silicon oxygen compound, silicon carbon composite, lithium metal, lithium titanate, lithium alloy (alloy formed by lithium and other metals that may form alloy with lithium), etc., or one or more combinations of other materials that may be used as negative active materials for secondary batteries.

The first layer 25 may be a separator, such as polyethylene, polypropylene, polyvinylidene fluoride and multilayer composite films thereof, but is not limited to these.

Figure 3:
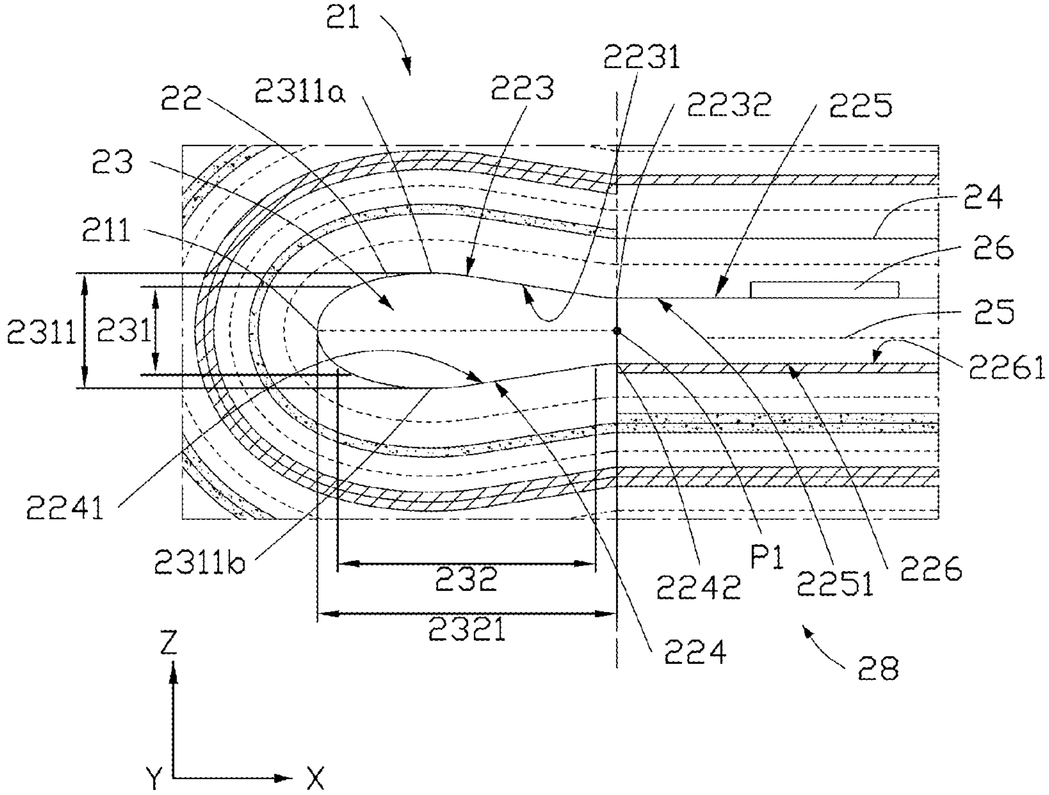
FIG. 3 is an enlarged diagram of a first region of the section A-A in the cell in an embodiment of the present application.

As shown in FIGS. 2 and 3, the first electrode plate 22, the second electrode plate 24 and the first layer 25 are stacked and form a first bending section 21 by being folded back. The first electrode plate 22, the second electrode plate 24 and the first layer 25 are stacked, and then further form a flat section 28, and the flat section 28 is connected with the first bending section 21.

A part of the first electrode plate 22 located in the first bending section 21 includes an first bending region 223 and a second bending region 224 that are connected with each other. The first bending region 223 and the second bending region 224 are demarcated by an inflection point 211 of the first bending section 21 and arranged opposite to each other.

A part of the first electrode plate 22 located in a flat section 28 includes an first part 225 and a second part 226 that are opposite to each other, and the first part 225 connects the first bending region 223 at a first connection point 2232, and the second portion 226 connects the second bending region 224 at a second connection point 2242.

It can be understood that among the first electrode plate 22, the second electrode plate 24 and the first layer 25, the first electrode plate 22 is located on the innermost side of the first bending section 21.

A first region 23 is provided at the innermost portion of the first bending section 21 in the electrode assembly 2, and the first region 23 is surrounded by the first bending region 223 and the second bending region 224.

A side of the first bending region 223 facing the first region 23 includes a first surface 2231, and a side of the second bending region 224 facing the first region 23 includes a second surface 2241. The first surface 2231 is connected with the second surface 2241 and is demarcated by the inflection point 211.

A side of the first part 225 facing the second part 226 includes a first plane 2251, and the first plane 2251 connects the first surface 2231 at the first connection point 2232.

A side of the second part 226 facing the first part 225 includes a second plane 2261, and the second plane 2261 connects the second surface 2241 at the second connection point 2242.

The first layer 25 is arranged between the first plane 2251 and the second plane 2261. The first plane 2251, the first layer 25 and the second plane 2261 may be butted against each other in turn, or may be arranged at intervals in turn.

Figure 4:
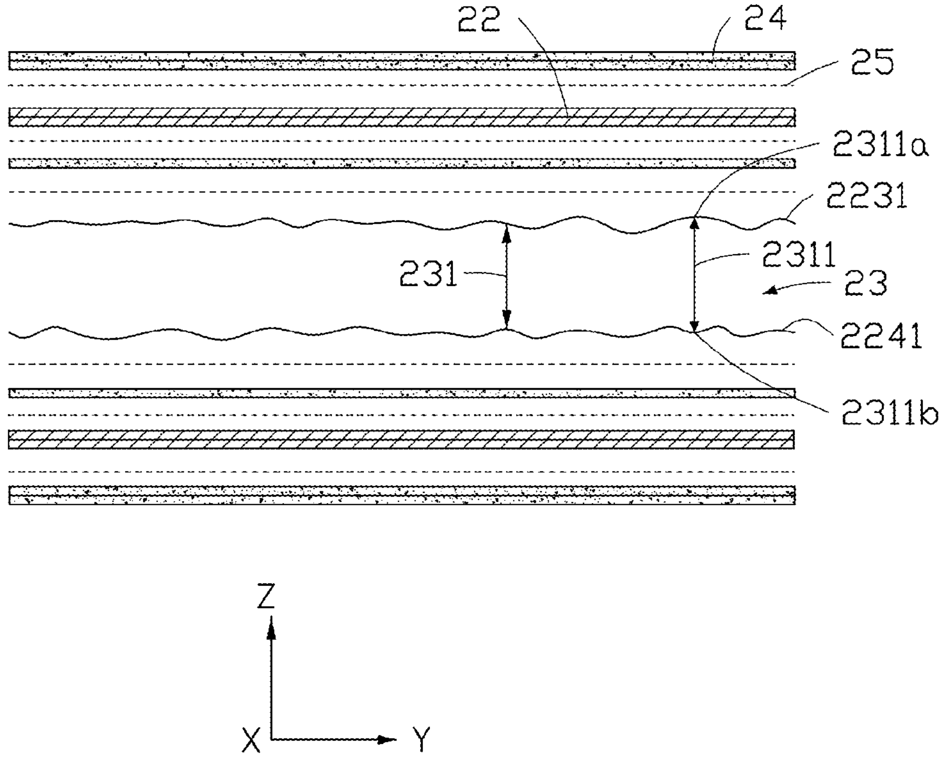
FIG. 4 is a partial section view of section B-B of the first region in the cell in an embodiment of the present application.

As shown in FIGS. 2, 3 and 4, in some embodiments, a certain spacing is provided between the first plane 2251 and the second plane 2261.

The direction extending from the inflection point 211 to the flat section 28 is a second direction X. A first direction Z and a third direction Y are respectively perpendicular to the second direction X, and when viewed from the third direction Y, a first distance 231 is provided between the first surface 2231 and the second surface 2241.

When viewed from the third direction Y, the first region 23 has a width in the second direction X, that is, second distance 232.

The first distances 231 between the first surface 2231 and the second surface 2241 in the first direction Z are different from each other in the second direction X, and the first distances 231 between the first surface 2231 and the second surface 2241 are different from each other in the third direction Y. Moreover, the first distance 231 between the first surface 2231 and the second surface 2241 includes a maximum first distance 2311. The edges of the maximum first distance 2311 are a first endpoint 2311*a* and a second endpoint 2311*b*, the first endpoint 2311*a* is located on the first surface 2231, and the second endpoint 2311*b* is located on the second surface 2241.

By taking a plane perpendicular to the second direction X and passing through the first endpoint 2311*a* and the second endpoint 2311*b* as a starting point, the first distance 231 gradually decreases from the first endpoint 2311*a* to the inflection point 211 in the second direction X, and the first distance 231 gradually decreases from the first endpoint 2311*a* to opposite to the inflection point 211 in the second direction X.

Figure 5:
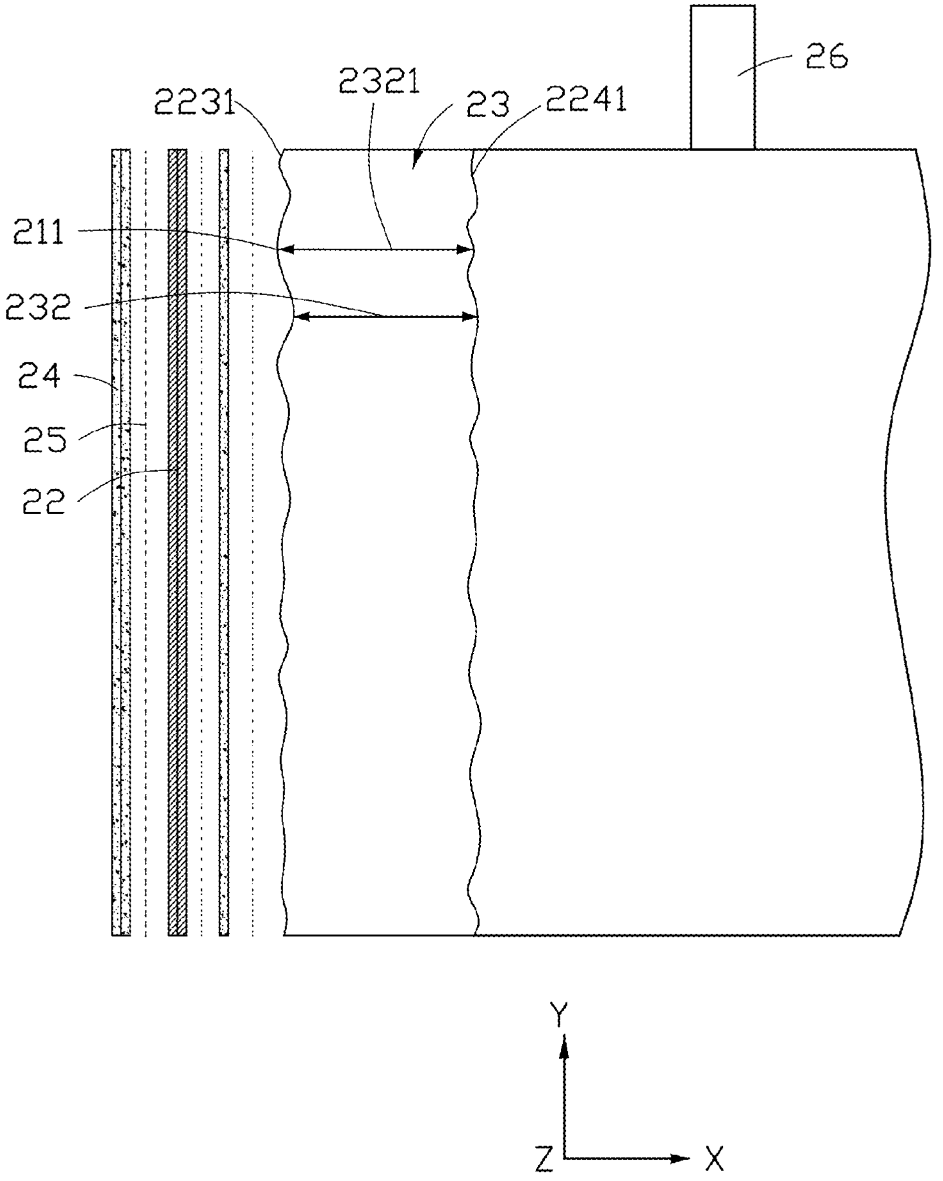
FIG. 5 is a partial section view of section C-C of the first region in the cell in an embodiment of the present application.

As shown in FIGS. 2, 3 and 5, the second distances 232 are different from each other in the first direction Z, and the second distances 232 are different from each other in the third direction Y. Moreover, the second distance 232 includes a maximum second distance 2321. As a virtual line as shown in FIG. 3, one end point of the maximum second distance 2321 is the inflection point 211, and the other end point is a midpoint P1 of a virtual line segment connecting the first connection point 2232 and the second connection point 2242.

In some embodiments, the second maximum distance 2321 is greater than the first maximum distance 2311.

Figure 6:
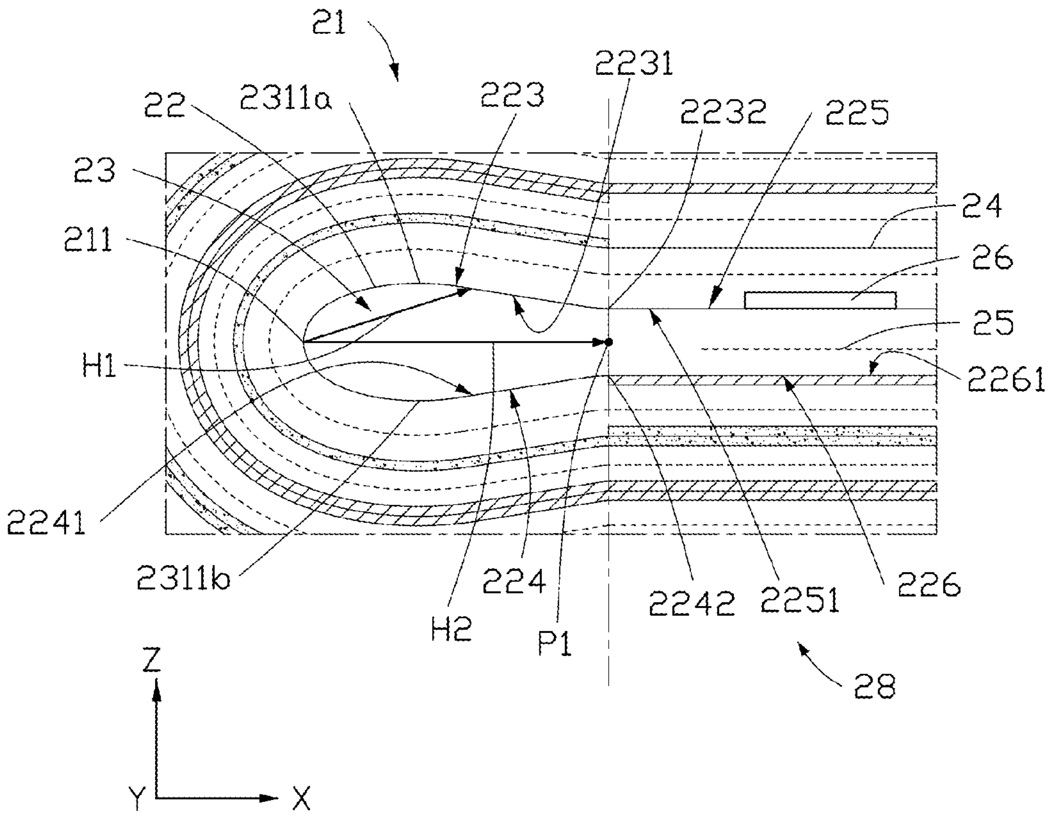
FIG. 6 is an enlarged diagram of the section A-A of the first region in the cell in an embodiment of the present application.

As shown in FIG. 6, when viewed from the third direction Y, a virtual connecting line starting from the inflection point 211 to any point of the first surface 2231 and/or the second surface 2241 constitutes a third distance H1, a virtual connecting line starting from the inflection point 211 to the midpoint P1 of a line segment connecting the first connecting point 2232 and the second connecting point 2242 constitutes a fourth distance H2, and the fourth distance H2>the third distance H1.

Figure 7:
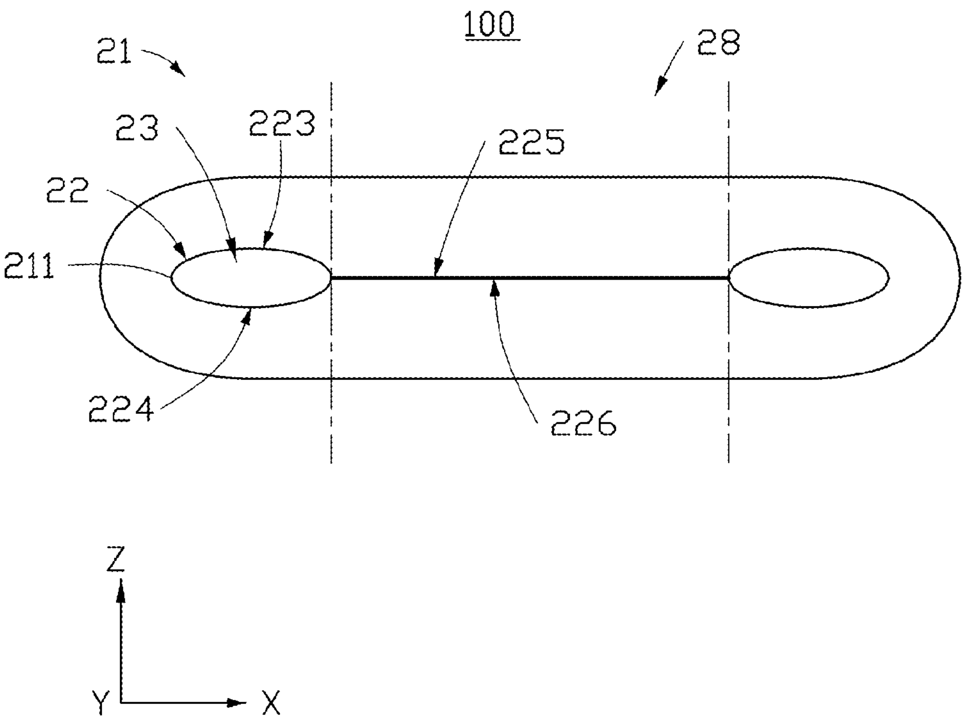
FIG. 7 is a front view of a cell in an embodiment of the present application.

As shown in FIG. 7, in some embodiments, the first part 225 and the second part 226 may also be directly connected with each other.

As shown in FIG. 3, in some embodiments, when viewed from the third direction Y, a direction of the virtual connecting line from the inflection point 211 to the midpoint P1 of the virtual line segment connecting the first connection point 2232 and the second connection point 2242 may be parallel to the second direction X.

Figure 8:
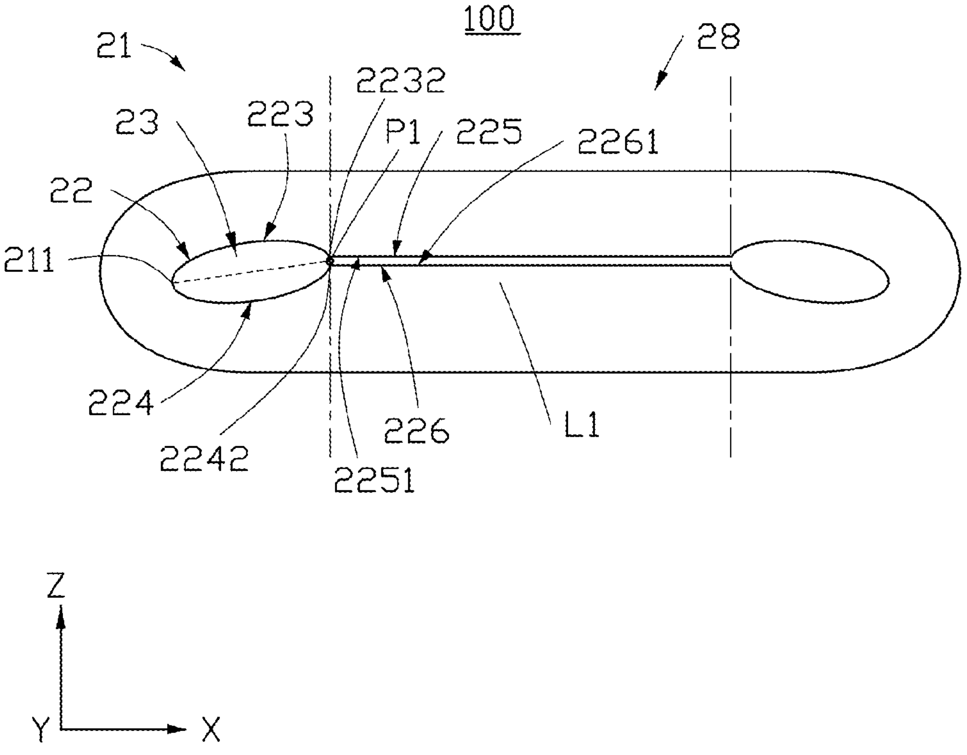
FIG. 8 is a front view of a cell in another embodiment of the present application.
Figure 9:
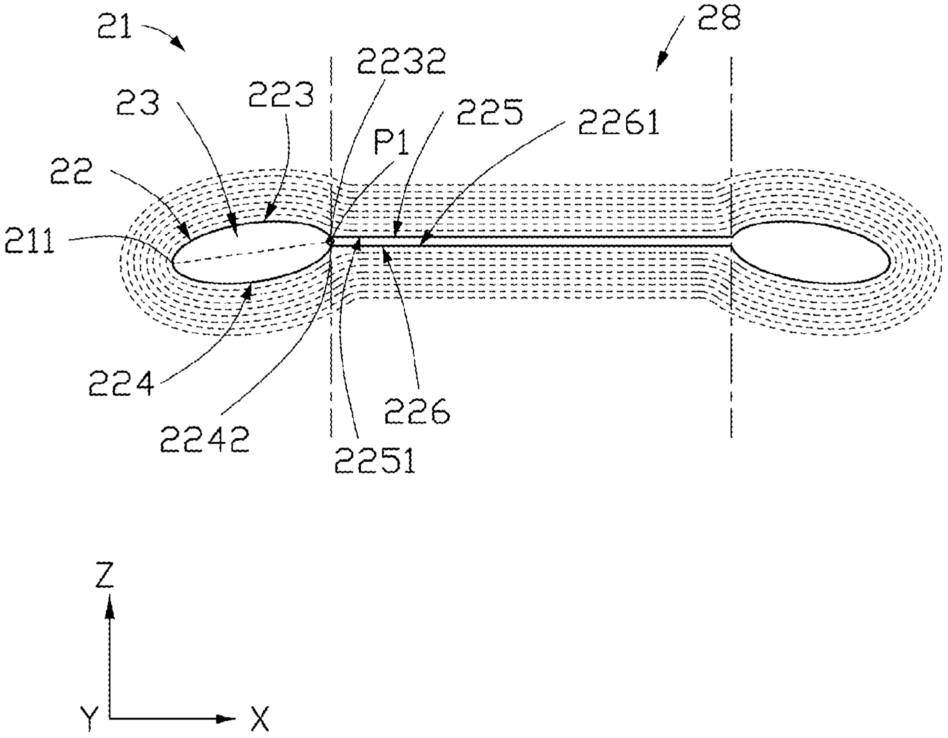
FIG. 9 is a front view of an electrode assembly in another embodiment of the present application.

As shown in FIGS. 8 and 9, in some embodiments, when viewed from the third direction Y, a direction of the connecting line from the inflection point 211 to the midpoint P1 of the line segment connecting the first connection point 2232 and the second connection point 2242 may be inclined to the second direction X.

Figure 10:
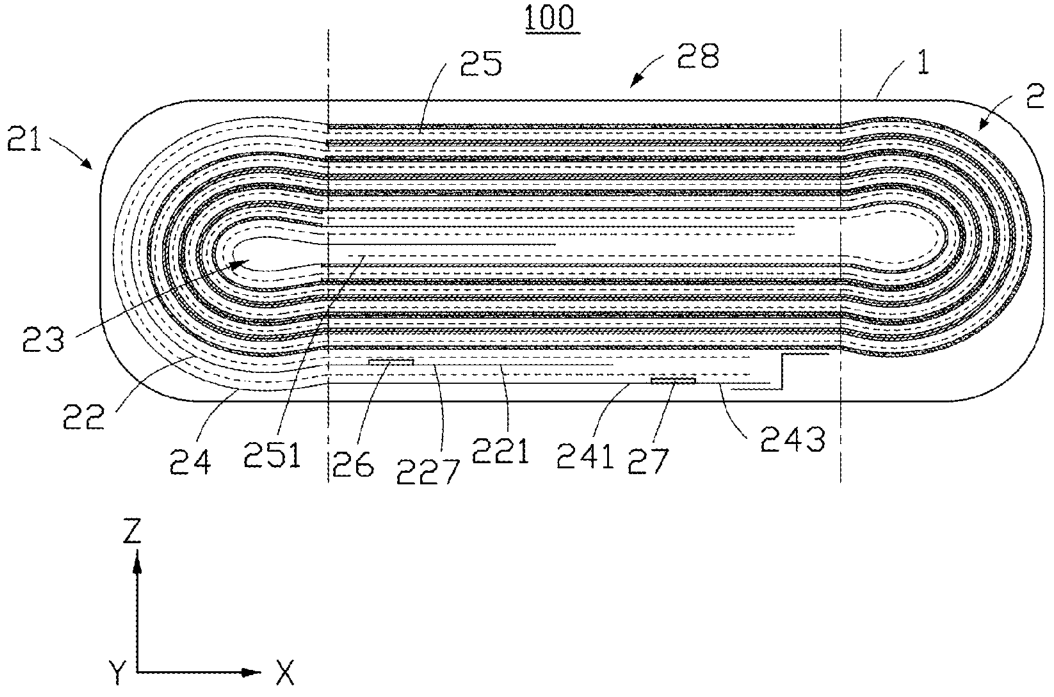
FIG. 10 is a sectional view of section A-A of a cell in another embodiment of the present application.

As shown in FIGS. 2 and 10, the electrode assembly 2 further includes a first metal plate 26 and a second metal plate 27.

The first electrode plate 22 further includes a second region 227, the second region 227 is located in the flat section 28, and the first metal plate 26 is electrically connected with the first conductive layer 221 on the second region 227.

The second electrode plate 24 further includes a third region 243, the third region 243 is located in the flat section 28, and the second metal plate 27 is electrically connected with the second conductive layer 241 on the third region 243.

In some embodiments, the second region 227 and the third region 243 are located in the flat section 28 and close to a central region 29 of the electrode assembly 2.

In the present application, the central region 29 of the electrode assembly 2 refers to a stacking center of the electrode assembly 2.

When the second region 227 and the third region 243 are close to the central region 29 of the electrode assembly 2, the second region 227 may be connected with the first part 225 or the second part 226, that is, the first metal plate 26 is electrically connected with the first conductive layer 221 on the first part 225 or the second part 226. The third region 243 may be adjacent to the first part 225 or the second part 226, that is, the second metal plate 27 is electrically connected with the second conductive layer 241 on the second electrode plate 24 adjacent to the first part 225 or the second part 226.

In some embodiments, the second region 227 and the third region 243 are located in the flat section 28 and in an outer region of the electrode assembly 2.

In the present application, the outer region of the electrode assembly 2 refers to one part of the electrode assembly 2 away from a stacking center.

The first metal plate 26 may be a first tab. The material of the first tab includes copper foil or aluminum foil, but is not limited to them.

The second metal plate 27 may be a second tab. The material of the second tab includes copper foil or aluminum foil, but is not limited to them.

It can be understood that the second region 227 and the third region 243 avoid the first region 23 and have a certain distance from the first region 23.

Continuing to refer to FIGS. 1 and 2, when viewed along the first direction Z, the first metal plate 26 and the second metal plate 27 avoid the first region 23 respectively, and have a certain distance from the first region 23.

A space of the first region 23 may be used to accommodate a separator and/or an electrolyte.

During an electrolyte injection process of the cell 100, the first region 23 may provide a flow channel for the electrolyte and maintain the electrolyte, so that the cell 100 is infiltrated by the electrolyte to a larger extent after electrolyte injection, so as to reduce the risk of poor local contact and performance loss caused by incomplete electrolyte infiltration.

Moreover, when the electrolyte outside the first region 23 is almost exhausted, the electrolyte located in the first region 23 may flow to a place where the electrolyte is missing under the action of capillarity for replenishment, so as to prolong a service life of the cell 100.

When the separator and/or the electrolyte is contained in the space of the first region 23, a filler may reduce a deformation of the first electrode plate 22 and the second electrode plate 24 of the first bending section 21 under pressure, reduce accumulation of internal stress, optimize a contact surface at the corner and improve a structural stiffness of the first bending section 21.

Along the third direction Y, the first region 23 may exist in different positions of the cell 100. For example, the first region 23 is located at an end portion of the cell 100 along the third direction Y.

The first region 23 may also be located at the end portion of the cell 100 along the third direction Y, at this time, the electrolyte in the first region 23 is communicated with or close to the electrolyte outside the first region 23, which may reduce a flow distance during electrolyte replenishment.

As was set forth, a first region 23 is provided inside the electrode assembly 2 of the present application, which may improve the actual electrolyte retention amount of the cell 100, improve the condition of the circulating interface and improve the service life of the cell 100. The structure is simple and reliable, and the economic efficiency of the battery is improved.

In addition, those skilled in the art may make other changes within the spirit of the present application. It goes without saying that these changes made according to the spirit of the present application shall be included in the scope disclosed in the present application.

What is claimed is:

1. A cell, comprising an electrode assembly with a wound structure, wherein the electrode assembly comprises:

a first electrode plate;

a second electrode plate; and a first layer comprising an insulating material and sandwiched between the first electrode plate and the second electrode plate; the first electrode plate, the second electrode plate and the first layer are stacked and wound to form the wound structure;

a part of the first electrode plate located at an innermost circle of the wound structure of the electrode assembly includes a first surface, a second surface opposite to the first surface in a first direction, and an inflection point connecting the first surface and the second surface; the electrode assembly further comprises a first region surrounded by the first surface and the second surface, and viewed from a third direction perpendicular to the first direction, a part of the first layer extends into the first region and is accommodated in a space of the first region;

wherein the inflection point is positioned at a part of a folded back part of the first electrode plate in the innermost circle of the wound structure; and there are two distances from the first surface to the second surface in the first direction along a second direction perpendicular to the first direction and the third direction, and the two distances are different from each other;

the first electrode plate is a positive electrode plate or a negative electrode plate, and the second electrode plate is of an opposite type relative to the first electrode plate;

the negative electrode plate comprises a negative active material, the negative active material comprises one or more selected from the group consisting of silicon, silicon oxygen compound and silicon carbon composite.

2. The cell according to claim 1, wherein the electrode assembly further comprises a maximum first distance from a first point of the first surface to a second point of the second surface in the first direction; and distances from the first surface to the second surface in the first direction gradually decreases as away from the first point along the second direction.

3. The cell according to claim 1, wherein a maximum width of the first region in the second direction is larger than a maximum width of the first region in the first direction.

4. The cell according to claim 3, wherein, in third direction perpendicular to the first direction and the second direction, a plurality of the maximum widths of the first region in the first direction are different from each other.

5. The cell according to claim 3, wherein, in third direction perpendicular to the first direction and the second direction, a plurality of the maximum widths of the first region in the second direction are different from each other.

6. The cell according to claim 1, wherein the first electrode plate further comprises:

a first bending region being a part of the first surface, and a second bending region being a part of the second surface and opposite to the first bending region in the first direction, and the second bending region being connected to the first bending region at the inflection point;

a first part connected to an edge of the first bending region opposite to the inflection point in the second direction; and a second part connected to an edge of the second bending region opposite to the inflection point in the second direction.

7. The cell according to claim 6, wherein a part of the first layer is arranged between the first part and the second part.

8. The cell according to claim 6, wherein the first part comprises a first plane;

and a direction the first plane extending has different angle from the second direction.

9. The cell according to claim 6, wherein the electrode assembly further comprises a first metal plate and a second metal plate; wherein the first electrode plate further comprises a first conductive layer and a second region, and the second region is connected with the first part or the second part;

the second electrode plate further comprises a second conductive layer and a third region, and the third region is adjacent to the first part or the second part;

the first metal plate is electrically connected with the first conductive layer located in the second region; and the second metal plate is electrically connected with the second conductive layer located in the third region.

10. The cell according to claim 6, wherein the electrode assembly further comprises a first metal plate and a second metal plate; wherein the first electrode plate further comprises a first conductive layer and a second region, and the second region is located at an end portion of the first electrode plate away from a central region of the electrode assembly;

the second electrode plate further comprises a second conductive layer and a third region, and the third region is located at an end portion of the second electrode plate away from the central region of the electrode assembly;

the first metal plate is electrically connected with the first conductive layer located in the second region; and the second metal plate is electrically connected with the second conductive layer located in the third region.

11. The cell according to claim 9, wherein the first conductive layer comprises a first current collector, and the second conductive layer comprises a second current collector.

12. The cell according to claim 1, wherein the first layer is a separator, and a part of the first layer is located between the first bending region and the second bending region.

13. The cell according to claim 6, wherein the electrode assembly further comprises:

a first connection point connecting the first bended region and the first part;

a second connection point connecting the second bended region and the second part; and a first midpoint being midpoint between the first connection point and the second connection point in the first direction;

wherein a extending direction of a virtual line connecting the first midpoint and the inflection point is defined as a fourth direction, and the fourth direction has a different angle in comparison with the second direction.

14. The cell according to claim 1, wherein the electrode assembly further comprises:

a first region surrounded by the first surface and the second surface; and a first metal plate electrically connected to the first electrode plate, and the first metal plate is distant from the first region viewed from the first direction.

15. An electronic device, comprising a cell, wherein the cell comprises an electrode assembly with a wound structure, and the electrode assembly comprises:

a first electrode plate;

a second electrode plate; and a first layer comprising an insulating material and sandwiched between the first electrode plate and the second electrode plate; the first electrode plate, the second electrode plate and the first layer are stacked and wound to form the wound structure;

a part of the first electrode plate located at an innermost circle of the wound structure of the electrode assembly includes a first surface, a second surface opposite to the first surface in a first direction, and an inflection point connecting the first surface and the second surface; the electrode assembly further comprises a first region surrounded by the first surface and the second surface, and viewed from a third direction perpendicular to the first direction, a part of the first layer extends into the first region and is accommodated in a space of the first region;

wherein the inflection point is positioned at a part of a folded back part of the first electrode plate in the innermost circle of the wound structure; and there are two distances from the first surface to the second surface in the first direction along a second direction perpendicular to the first direction and the third direction, and the two distances are different from each other;

the first electrode plate is a positive electrode plate or a negative electrode plate, and the second electrode plate is of an opposite type relative to the first electrode plate;

the negative electrode plate comprises a negative active material, the negative active material comprises one or more selected from the group consisting of silicon, silicon oxygen compound and silicon carbon composite.

16. The electronic device according to claim 15, wherein the electrode assembly further comprises a maximum first distance from a first point of the first surface to a second point of the second surface in the first direction; and distances from the first surface to the second surface in the first direction gradually decreases as away from the first point along the second direction.

17. The electronic device according to claim 15, wherein a maximum width of the first region in the second direction is larger than a maximum width of the first region in the first direction.

18. The electronic device according to claim 17, wherein, in third direction perpendicular to the first direction and the second direction, a plurality of the maximum widths of the first region in the first direction are different from each other.

19. The electronic device according to claim 17, wherein, in third direction perpendicular to the first direction and the second direction, a plurality of the maximum widths of the first region in the second direction are different from each other.

20. The electronic device according to claim 15, wherein the first electrode plate further comprises:

a first bending region being a part of the first surface, and a second bending region being a part of the second surface and opposite to the first bending region in the first direction, and the second bending region being connected to the first bending region at the inflection point;

a first part connected to an edge of the first bending region opposite to the inflection point in the second direction; and a second part connected to an edge of the second bending region opposite to the inflection point in the second direction.

* * * * *